June 26, 1962 H. M. COHN 3,041,108
BACK SUPPORT
Filed June 12, 1961
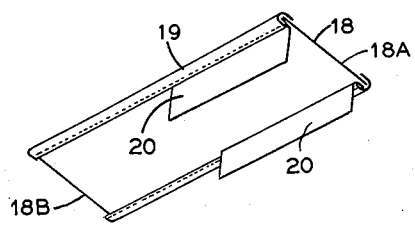
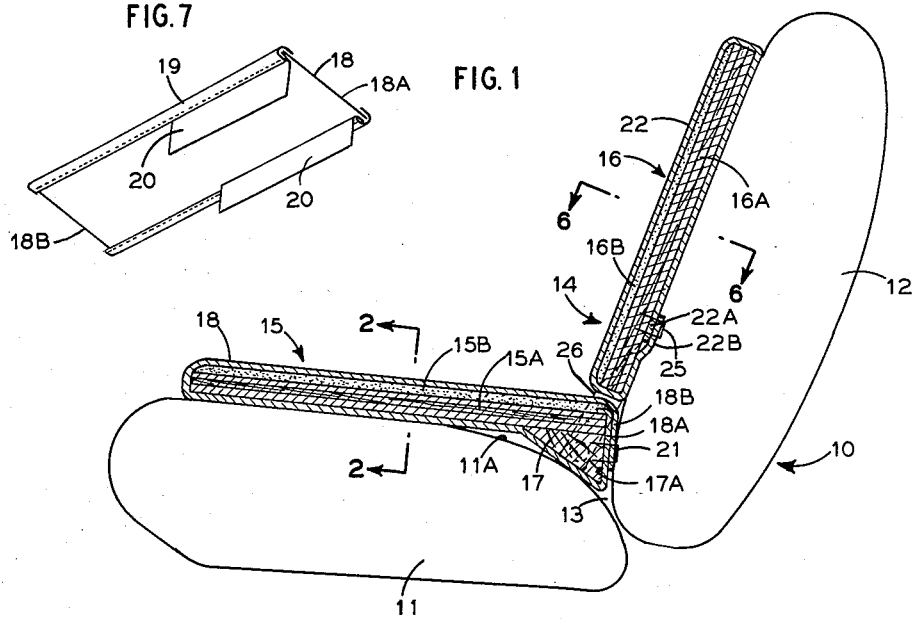
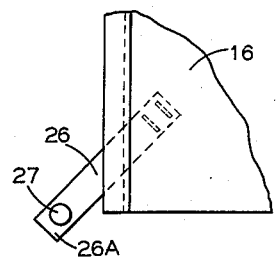
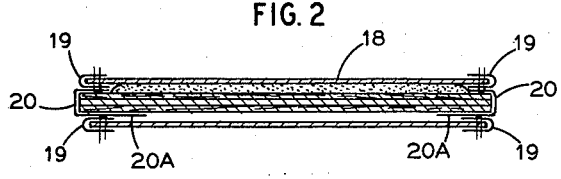
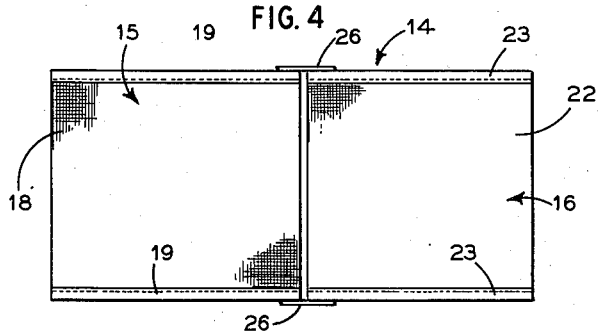
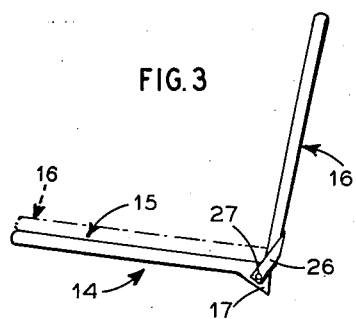
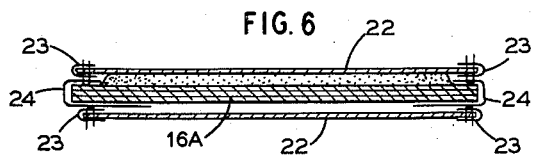
INVENTOR.
H. Marvin Cohn
BY
Irving Seidman
ATTORNEY

United States Patent Office 3,041,108
Patented June 26, 1962

3,041,108
BACK SUPPORT
Herman Marvin Cohn, 2219 E. 27th St., Brooklyn, N.Y.
Filed June 12, 1961, Ser. No. 116,413
3 Claims. (Cl. 297—378)

This invention relates generally to a back support, and more particularly to a padded orthopedic back support particularly adapted for use on a car seat for relieving back strain and fatigue in driving.

The customary car seat consists of a seat cushion and a back cushion in which the seat cushion has a curving surface which slopes downwardly toward the back cushion to form at the junction thereof a void or hollow extending transversely along the length of the car seat. Heretofore, the back support utilized on such car seats consisted simply of a flat seat portion which was positioned on the seat cushion of the car. Consequently because of the curvature of the car seat cushion the seat portion of the known car back supports were not evenly supported thereon. As a result the seat portion of those prior known constructions tended to rock each time the user shifted his weight. For this reason the back supports of known construction were not truly comfortable, and thus did not fully satisfy their intended purpose.

Therefore an object of this invention is to provide an improved back support having a seat portion constructed and arranged so as to be evenly and firmly supported on the seat cushion of an automobile or the like.

Another object is to provide for an improved padded orthopedic back support having seat portion and back portion pivotally connected together for movement between a folded, space saving or stowed position to operative sitting position, or to extended open position.

Still another object is to provide a back support having a seat portion with a readily detachable and pivotally connected back portion.

A still another object is to provide a padded orthopedic back support with a fabric covering that can be easily applied with a minimum of efforts, and which facilitates the manufacture and assembly thereof.

A feature of this invention resides in the provision of an improved back support that is positive in operation, relatively simple in construction, easily and economically fabricated, and pleasing and attractive in appearance.

Other features and advantages will be rendered readily apparent when considered in view of the drawings and description in which:

FIG. 1 is a sectional side view of the back support of this invention illustrated in operative position on a car seat.

FIG. 2 is a section view taken along line 2—2 of FIG. 1.

FIG. 3 is a side view of the back support shown in operative and inoperative positions, the latter being shown in dotted lines.

FIG. 4 illustrates the back support opened to fully extended position.

FIG. 5 is a detail view of the pivoting strap means.

FIG. 6 is a sectional view taken along line 6—6 of FIG. 1.

FIG. 7 is a detail perspective view illustrating the fabric covering of the seat portion of the back support of this invention. The covering of the back portion is similarly constructed.

Referring to the drawings there is shown in FIG. 1 a typical vehicle seat 10, e.g. a car seat, comprising a seat cushion 11 and a back cushion 12. As shown the upper surface 11A of a typical seat cushion 11 is formed with a curving surface that slopes downwardly toward the back cushion 12 and forms at the junction therebetween a transversely extending void or valley 13 thereat.

In accordance with this invention a back support 14 is specifically adapted for use on such seats 10. As shown the back support 14 comprises a seat portion 15 and a back portion 16 pivotally connected to one another for movement between operative and inoperative position. Accordingly, the seat portion 15 includes an orthopedic ply board seat 15A covered with a layer of soft padding 15B, such as foam rubber or the like. Connected to the under surface of the seat board at the rear end of the seat board 15A is a wedge block 17. In the illustrated embodiment the wedge block 17 extends transversely of the entire width of the seat portion 15. However, it will be understood that the wedge 17 may be formed of a series of aligned blocks placed at spaced intervals transversely along the rear edge of the seat board 15A. In the illustrated embodiment the wedge block 17 is formed with a substantially right triangle cross section and it is connected to the underside of the seat board 15A so that its base 17A is adapted to face the back cushion 12 and its apex being disposed forwardly thereof. Enwrapping the entire seat portion 15 of the back support 14 is a fabric covering 18.

In accordance with this invention the fabric covering 18 comprises a strip of fabric 18 that is wrapped about the front and rear ends of the seat board 15A with the ends 18A, 18B of the fabric overlapping at the rear end of the seat portion 15. As seen in FIG. 2, the covering strip of fabric 18 is provided with a binding 19 secured to the longitudinal edge of the strip of fabric 18 to form a bead thereat. Also that length of fabric covering the upper surface of the seat portion 15 has a flap 20 sewed thereto. As best seen in FIG. 2, when the strip 18 is laid over the top of the seat board 15A and foam layer 15B thereon, the flaps 20 along each edge thereof are wrapped about the respective edge portions of the seat board 15A and tucked under against the lower surface thereof. See FIG. 2. The extended portion of the strip 18 not provided with a flap is then folded under the seat 15 and over the tucked under flaps 20, the ends of the strips 18A, 18B being placed in overlapping relationship. Staples 21 are utilized to fasten the overlapped ends 18A, 18B of the fabric 18 to the rear end of the seat portion 15. If desired staples may be used to tack the fabric covering to the under surface of the seat board at spaced intervals.

The back portion 16 of the support also includes an orthopedic ply board 16A covered with a layer of padding or foam rubber 16B or the like. As with the seat portion 15, the back portion 16 is also enwrapped with a strip of fabric 22 in much the same manner as described with respect to the seat portion. This is evident in FIGS. 2 and 6 where it is seen that both seat and back portions 15, 16 have a similar cross sectional appearance.

The fabric strip 22 covering the back portion 16 also has a binding 23 extending the longitudinal edge thereof with a flap portion 24 connected along only a portion of the length thereof. As with the seat portion 15 the flap 24 of the back portion 16 is folded about the edge of the ply board 16A and tucked under the back surface ply board 16A when the strip 22 is placed over the upper surface of the board 16A. With the flaps 24 tucked under the ply board 16A, FIG. 6, the extended portion of the fabric 22 is folded over the ends of the ply board 16A to enwrap the back portion 16. As with the seat portion 15, the ends 22A, 22B of the fabric 22 overlie one another, and are fastened by suitable means such as staples 25.

In accordance with this invention the back portion 16 is pivotally connected to the seat portion 15 by a strap means 26. Referring to FIGS. 1, 3, 4 and 5, a strap 26 is fixed or stapled to one of the back support portions, e.g. the back portion 16 as shown in FIG. 5. The free end 26A of the strap 26 is provided with a snap fastener 27 which is adapted to mate with a companion fastener connected to the edge portion of the seat portion 15. Thus it will be noted that the snap fasteners 27 render the seat portion 15 and back portion 16 readily detachable; and the straps 26 function as a hinge permitting the back portion 16 to pivot through a 180° arc as seen in FIGS. 3 and 4. The readily detachable feature of the back support 14 renders each back support portion 15 and 16 individually usable, if desired.

With a back support 14 constructed as described, it will be readily apparent in view of FIG. 1 that in use the block or wedge 17 is arranged to fit the void or valley 13 formed at the junction formed between seat cushions 11 and 12, and thus insures that the seat portion 15 is always maintained in even elevated position, depite shifting of the body weight thereon. Thus a more comfortable and less fatiguing drive may be had. Also the wedge or block 17 firmly anchors the back support 14 in position in the car seat 10.

From the foregoing description it will be apparent that the back support is relatively simple in construction, positive in operation, pleasing in appearance, economically and easily fabricated.

While the instant invention has been disclosed with reference to a particular method and a particular embodiment for practicing the same, it is to be appreciated that the invention is not to be taken as limited to all of the details thereof as modifications and variations thereof may be made without departing from the spirit or scope of the invention.

What is claimed is:

1. For use on a car seat having a seat cushion and a back cushion wherein said seat cushion slopes downwardly toward the back cushion forming a void at the junction thereof, a back support for relieving back strains and fatigue during driving and adapted to snugly fit said car seat, said back support comprising a seat portion and a back portion, means for pivotally connecting said back portion to said seat portion for moving said back portion between inoperative folded position and operative unfolded position, said pivoting means including a strap fixed at one end to one of said back support portions, and a snap fastener for detachably connecting the other end of said strap to the other back support portion, a wedge block connected to the undersurface of said seat portion of said back support at the rear end thereof, said wedge block being adapted to occupy the void between the car seat cushions when said back support is in operative position on said car seat so that said wedge block maintains said back support seat portion in an even elevated position and prevents relative movement between the seat and back support, and a strip of fabric covering enwrapping each said seat portion and back portion of said back support, each said fabric covering having a binding sewed along its respective longitudinal edge portions, a flap sewed to the binding along a portion of the length thereof, said flap being folded about the side edges of its respective seat and back portion, and said strip of fabric being folded over the ends of its respective seat portion and back portion of said back support so that the ends of the strip overlap one another, and means for securing the overlapped ends of said strip to one another and to the respective back support portion which it covers.

2. For use on a car seat having a seat cushion and a back cushion and said seat cushion slopes downwardly toward the back cushion forming a void at the junction thereof, a back support for relieving back strains and fatigue during driving and adapted to snugly fit said car seat, said back support comprising a seat portion and a back portion, each of said back support portions including an orthopedic ply board, a layer of soft foam material adhered to each of said boards, a wedge connected to the undersurface and at the rear end of said orthopedic board of said seat portion of said back support, and a strip of fabric covering enwrapping each of said seat portion and back portion, each of said strips including a binding sewed along the longitudinal edges thereof, a flap sewed to each of said bindings and extending along a portion of its length, said flaps being adapted to be folded over and under the side edges of the respective back support portions and said strip of fabric being folded over the ends of its respective seat portion and back portion of said back support so that the ends of the respective strips overlie one another, means for pivotally connecting said back portion to said seat portion for moving said back portion between inoperative folded position and operative unfolded position, said pivoting means including a strap fixed at one end to one of said back support portions and a snap fastener for detachably connecting the other end of said strap to said other back support portion, and said wedge occupying the void between the car seat cushions when said back support is in operative position on said car seat so that said wedge serves to anchor and maintain said back support seat portion in an even elevated position.

3. A back support for relieving back strains and fatigue during driving and adapted to snugly fit a car seat having an external void defined at the junction of the car seat cushion and back cushion, said back support comprising a seat portion and a back portion, means for pivotally connecting said back portion to said seat portion for moving said back portion between inoperative folded position and operative unfolded position, said pivoting means including a strap fixed at one end to one of said back support portions, and a snap fastener for detachably connecting the other end of said strap to the other back support portion, a rigid wedge block connected to the undersurface of said seat portion of said back support at the rear end thereof. said rigid wedge block being adapted to occupy the void between the car seat cushions when said back support is in operative position on said car seat so that said wedge block maintains said back support seat portion in an even elevated position and prevents relative movement between the seat and back support, and a strip of fabric covering enwrapping each of said seat portion and back portion of said back support, each of said fabric coverings having a binding sewed along its respective longitudinal edge portions, a flap sewed to the binding along a portion of the length thereof, said flap being folded about the side edges of its respective seat and back portion, and said strip of fabric being folded over the ends of its respective seat portion and back portion of said back support so that the ends of the strip overlap one another, and means for securing the overlapped ends of said strip to one another and to the respective back support portion which it covers.

References Cited in the file of this patent

UNITED STATES PATENTS

| | | |
|---|---|---|
| 1,492,651 | Rowley | May 6, 1924 |
| 1,954,376 | Brueckl | Apr. 10, 1934 |
| 2,601,890 | Smith | July 1, 1952 |